United States Patent [19]
Lacey

[11] 3,796,146
[45] Mar. 12, 1974

[54] METHOD AND APPARATUS FOR CUTTING NONUNIFORM ARTICLES INTO UNIFORM PIECES

[76] Inventor: Edward H. Lacey, Rural Rt., Trent, S. Dak. 57065

[22] Filed: Oct. 19, 1971

[21] Appl. No.: 190,572

[52] U.S. Cl.................... 99/514, 83/364, 99/489, 99/550
[51] Int. Cl.... A23n 15/00, A47j 44/00, B26d 4/06, B26d 5/34
[58] Field of Search........ 99/514, 549, 550, 233.12, 99/489; 83/364

[56] References Cited
UNITED STATES PATENTS

| | | | |
|---|---|---|---|
| 3,195,596 | 7/1965 | Peterson | 99/514 |
| 3,603,457 | 9/1971 | Flodin | 99/489 X |
| 3,468,098 | 9/1969 | Eisenberg | 53/123 |
| 3,662,518 | 5/1972 | Eisenberg | 53/123 |
| R26,796 | 2/1970 | Lamb | 99/233.12 |
| 1,337,968 | 4/1920 | Schroeder | 99/550 X |
| 3,090,414 | 5/1963 | Briggs | 99/550 X |
| 3,643,721 | 2/1972 | Haubner | 99/233.12 X |
| 3,233,484 | 2/1966 | Davis | 83/364 X |
| 3,466,958 | 9/1969 | Munson | 83/364 X |
| 3,666,079 | 5/1972 | Anderson | 99/550 X |

FOREIGN PATENTS OR APPLICATIONS

| 185,993 | 10/1966 | U.S.S.R. | 83/364 |
|---|---|---|---|

Primary Examiner—Wayne A. Morse, Jr.
Attorney, Agent, or Firm—Clarence A. O'Brien; Harvey B. Jacobson

[57] ABSTRACT

Nonuniform articles, such as potatoes, are cut into uniform pieces by subjecting the articles to a centrifugal force for orienting each article along its longitudinal axis, transferring tangentially each oriented article to a conveyor defining a conveying path for forming a single row of articles moving in a conveying direction and oriented with their longitudinal axes parallel to the conveying path, feeding the single row of articles past a plurality of measuring stations, measuring a longitudinal length for each article passing a measuring station, removing from the conveyor each article having a longitudinal length greater than a length predetermined for the respective measuring station, and cutting each article into uniform pieces. Apparatus for performing the method has a cylindrical wall defining an opening for the transfer of the articles to the conveyor and a cone-shaped disc mounted for rotation and arranged within the cylindrical wall for supplying the centrifugal force. A plurality of sensing devices is used to measure the length of the passing articles, and a plurality of associated plungers is provided to remove the articles from the conveyor and move the articles into a cutting assembly. The sensing devices are arranged in the conveying direction to remove articles having progressively shorter longitudinal lengths.

13 Claims, 8 Drawing Figures

Edward H. Lacey
INVENTOR.

Edward H. Lacey
INVENTOR.

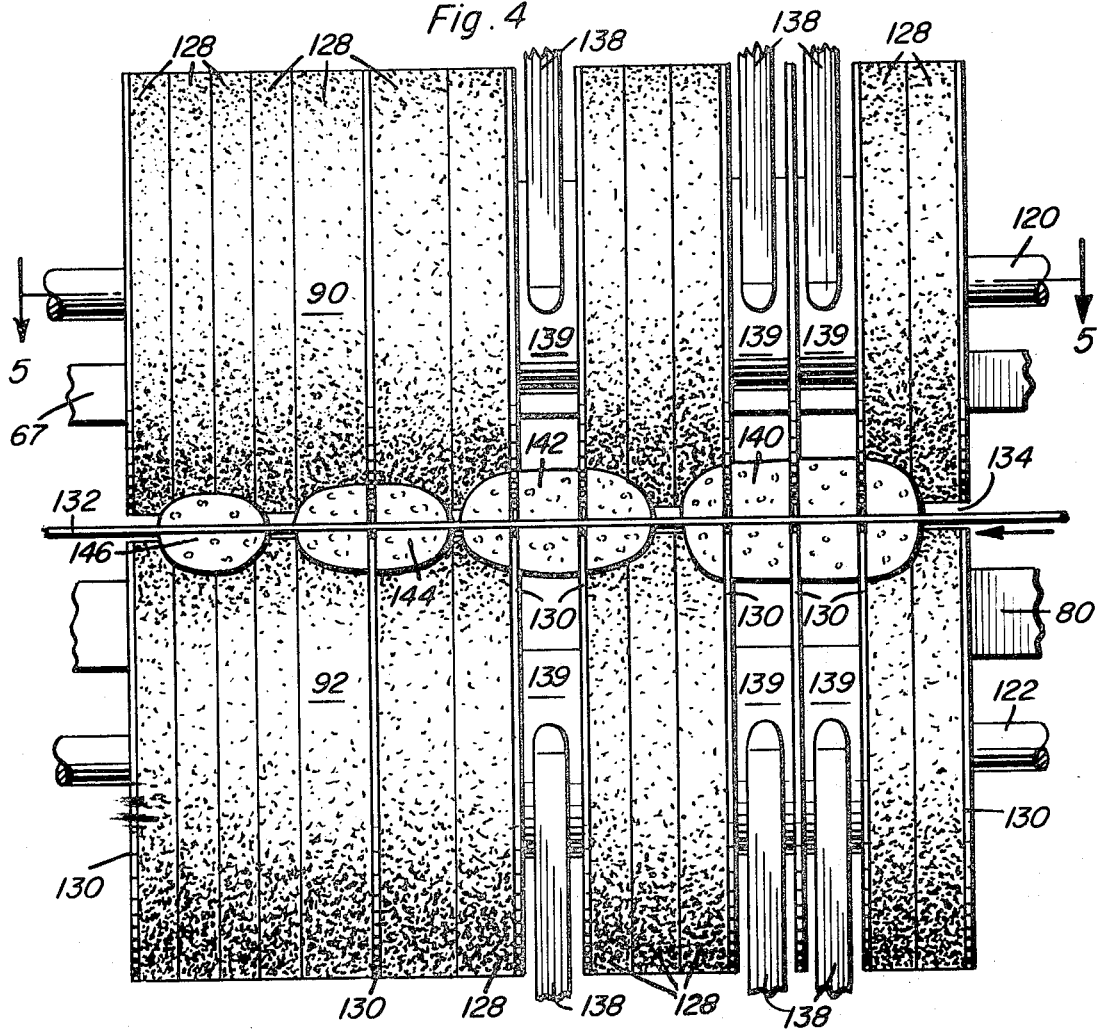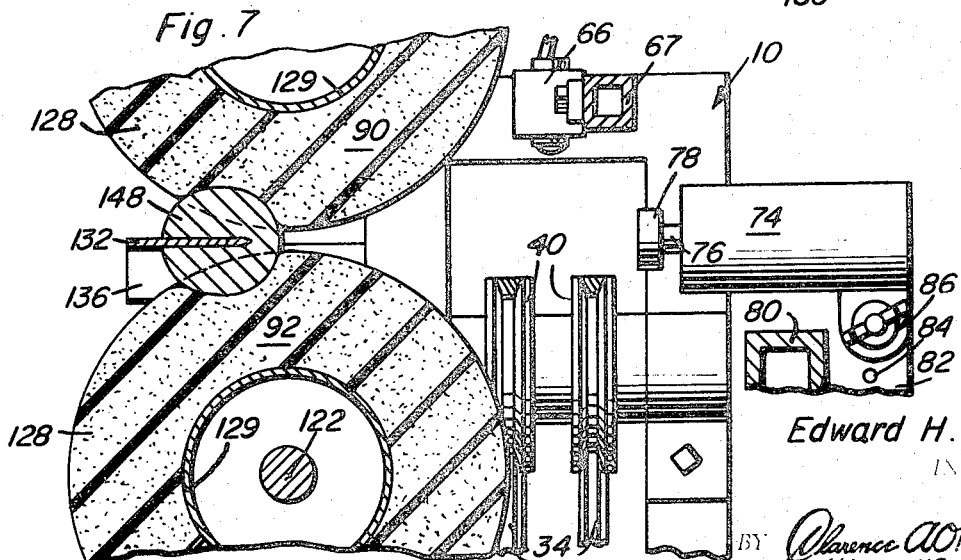

Edward H. Lacey
INVENTOR

BY Clarence A. O'Brien
and Harvey B. Jacobson
Attorneys

METHOD AND APPARATUS FOR CUTTING NONUNIFORM ARTICLES INTO UNIFORM PIECES

BACKGROUND OF THE INVENTION

The present invention relates to a method and apparatus for cutting nonuniform articles, such as potatoes, into uniform pieces by arranging the articles on a conveyor in a single row and in a predetermined orientation by first subjecting the articles to a centrifugal force for orienting each article along its longtudinal axis and then transferring tangentially each oriented article to a conveyor, and feeding the single row of articles past a plurality of measuring stations, measuring a longitudinal length for each article passing thereby, removing from the conveyor each article having a longitudinal length greater than a length predetermined for the respective measuring station, and cutting each article into uniform pieces.

In the past, great difficulties have been encountered in cutting, for example, seed potatoes into uniform seed pieces. This has been a particular problem when cutting potatoes of the long variety, such as the Russett-Burbank potato. The long variety of potatoes do not mechanically sort particularly well due to the lack of uniformity of shape. A potato, for example, two inches long could have the same cross-sectional area as a potato, for example, four inches long, or even longer. The cross-sectional area could also have a round or a flat oval configuration. Due to this irregular shape, the great majority of the long variety of potatoes is still cut by hand, or is placed by hand on a grid of knives and is forced through the grid with a plunger so as to be cut into seed pieces. It has been a particular problem to have the proper length potato placed into the knives so that, for example, a four-piece seed potato would be cut into four pieces of the same size.

SUMMARY OF THE INVENTION

It is an object of the present invention to provide a method and apparatus for cutting nonuniform articles, such as potatoes, into uniform pieces.

This and other objects are realized according to the present invention by arranging on a conveyor in a predetermined orientation non-uniform articles each defining a longitudinal axis, and sorting the nonuniform articles by differences in the longitudinal length thereof.

The method according to the present invention is carried out by the basic steps of orienting nonuniform articles along their longitudinal axes, feeding a single row of articles oriented with their longitudinal axes parallel to a conveying direction past a plurality of measuring stations, measuring a longitudinal length for each article passing any measuring station, removing from the conveyor each article having a longitudinal length greater than a length predetermined for the respective measuring station, and cutting each article into uniform pieces by feeding same into a cutting device associated with the respective measuring station at which the article is removed.

The setp of orienting includes the steps of subjecting nonuniform articles to a centrifugal force for orienting each article, and transferring tangentially each oriented article to a conveyor defining a conveying path for forming a single row of articles moving in a conveying direction and oriented with their longitudinal axes parallel to the conveying path.

The step of subjecting includes the step of forcing the articles against a curved surface, and the step of measuring includes the step of arranging the measuring stations in the conveying direction to remove articles having progressively shorter longitudinal lengths.

The method of sorting articles according to the present invention includes the step of feeding the articles to be cut into uniform pieces into a cutting device associated with the respective measuring station at which the article is removed.

A preferred embodiment of the apparatus for carrying out the method according to the present invention has means for orienting each of a plurality of nonuniform articles along its longitudinal axis and includes means for subjecting each article to a centrifugal force, conveyor means for receiving each oriented article transferred tangentially from the means for subjecting and defining a conveying path for forming a single row of articles oriented with their longitudinal axes parallel to the conveying path, means for measuring a longitudinal length for each article passing by any of a plurality of measuring stations included in said means for measuring and arranged along the conveying path, means associated with said means for measuring for removing from the conveying path each article having a longitudinal length greater than a length predetermined for the respective measuring station, and means arranged to receive each removed article for cutting each article into uniform pieces.

A preferred embodiment of the arranging apparatus for subjecting the articles to a centrigual force has a cylindrical wall defining an opening for the transfer of the articles to conveyor means, and a cone-shaped disc mounted for rotation and arranged within the cylindrical wall for supplying the centrifugal force. Means such as at least one roller is arranged in the cylindrical wall for preventing the articles from catching the cylindrical wall and tumbling as they approach the opening. The conveyor means has a pair of parallel, spaced apart, endless belts.

The measuring stations of the sorting apparatus are arranged in the conveying direction to remove articles having progressively shorter longitudinal lengths.

The means for removing of the sorting apparatus has a plurality of plungers, and said means for measuring has a plurality of sensing devices arranged to be blocked by passing articles and operably connected to the plungers to actuate the same when the sensing devices are blocked for a predetermined time. The plungers have resilient contact pads providing padded contact surfaces, and are mounted to be lowerable and tiltable.

The means for cutting may be, for example, a potato seed cutter, and the nonuniform articles may be, for example, potatoes to be cut into uniform seed pieces.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 4 is a partial, vertical longitudinal view on an enlarged scale showing a detail of the embodiment of FIGS. 1 to 3.

FIG. 7 is a sectional detail view similar to FIG. 6, but showing the apparatus in a different stage of operation.

DESCRIPTION OF THE PREFERRED EMBODIMENT

Figure 1:
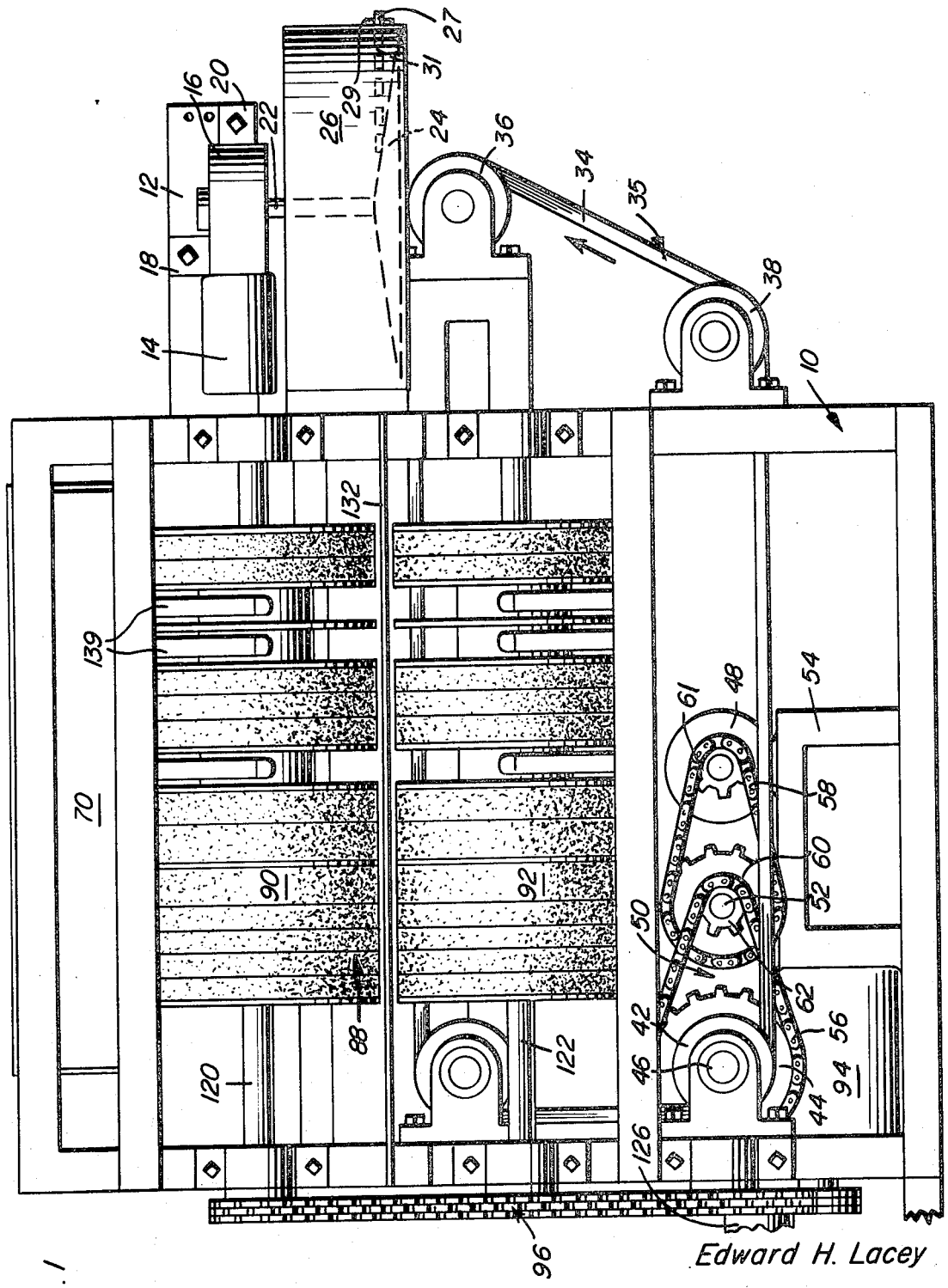
FIG. 1 is a vertical longitudinal view showing a preferred embodiment of the present invention.

FIG. 1 of the drawings shows a preferred embodiment of the present invention which is particularly intended to cut, for example, potatoes into seed pieces.

A frame 10, which may be constructed in a known manner from, for example, steel angles, is provided for mounting the other elements.

Figure 2:
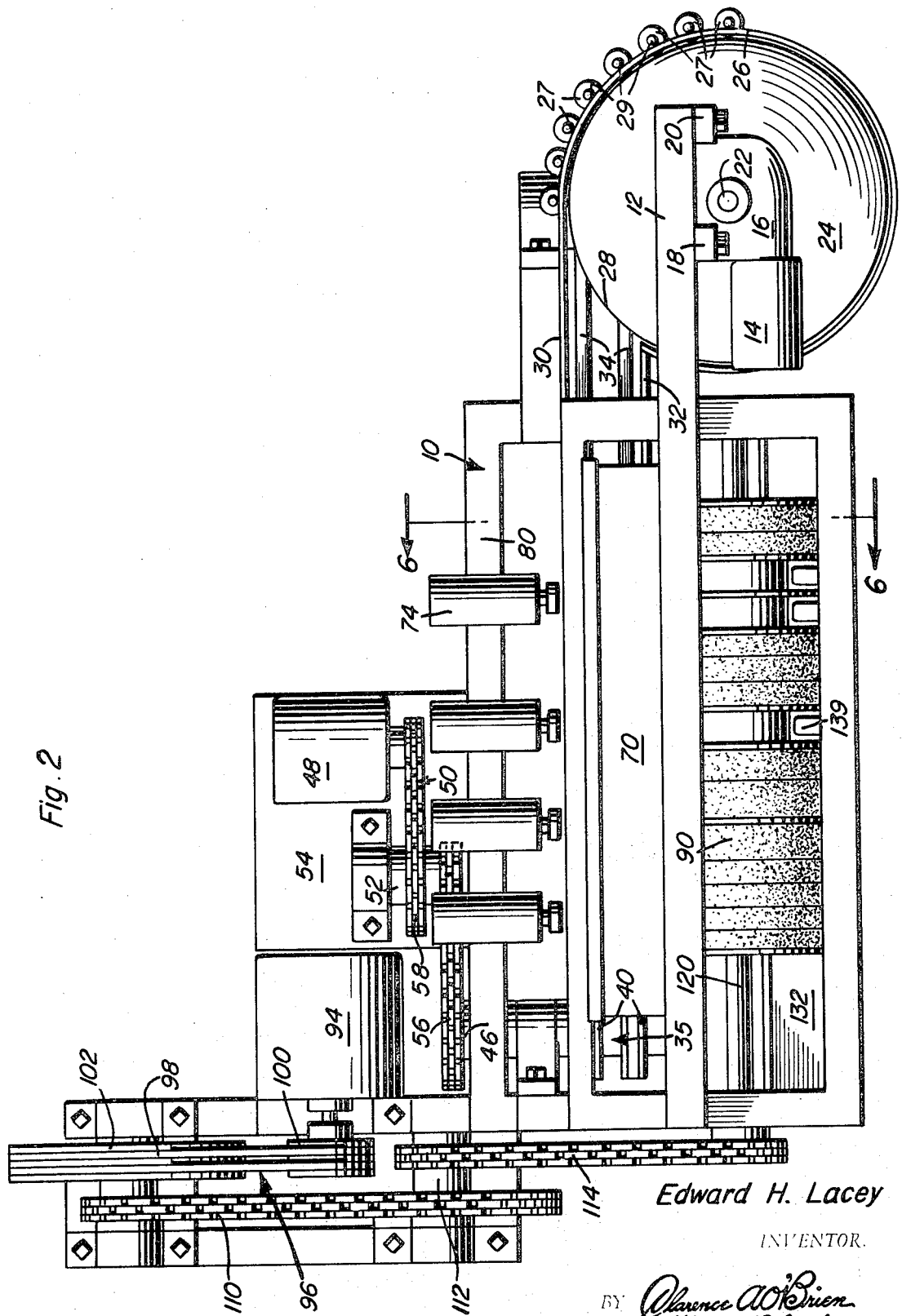
FIG. 2 is a top plan longitudinal view of the embodiment shown in FIG. 1.

A member 12 extends from frame 10 and supports a suitable, known motor 14, such as an electric motor, having a suitable, known right-angle gear box 16. Motor 14 and gear box 16 may be mounted to member 12 in a suitable, known manner, such as being, for example, bolted thereto at flanges 18 and 20. A shaft 22 is rotatably connected to gear box 16 for rotation thereby. A cone-shaped disc 24 is attached to the lower end of shaft 22 for rotation therewith. The cone surface of disc 24 slopes downwardly in the outward direction, as can be seen from FIG. 1. A cylindrical wall 26 defining an opening 28 and having tangential guide portions 30 and 32 is arranged about disc 24 (see FIG. 2). Wall 26 may be mounted to frame 10 by means of portions 30,32 as by, for example, welding or screw fasteners. In addition, member 12 may be extended further out to provide additional support for wall 26. A plurality of rollers 27 is mounted for rotation in the upper-right quadrant of wall 26 as seen in FIG. 2. Rollers 27 are mounted on respective shafts 29 which are in turn attached in a known manner to the outer surface of wall 26, with a portion of each roller 27 extending through a respective opening 31 defined in wall 26. The purpose of rollers 27 will be discussed below.

In addition to the level orientation of disc 24 shown in FIG. 1, shaft 22, and, hence disc 24, may be made tiltable. This may be accomplished by, for example, mounting motor 14 and gear box 16 to a member 12 by means of slotted brackets (not shown) and bolts and wing nuts (not shown). Alternatively, member 12 could be mounted to frame 10 in a known manner for rotation about its longitudinal axis. The advantages of a tiltable disc 24 includes more effective action on the potatoes and facilitates the use of an automatic feeding device.

Figure 3:
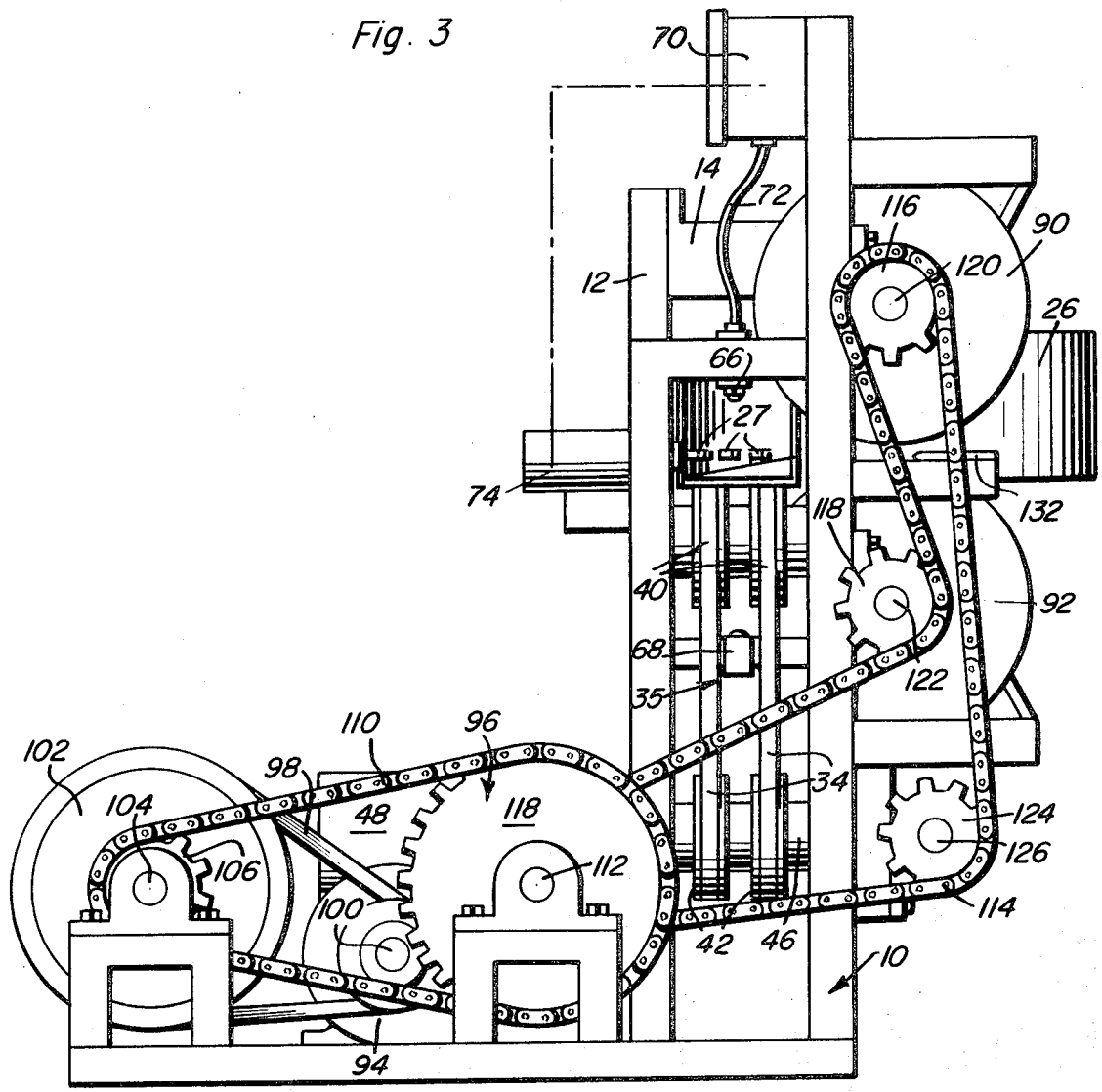
FIG. 3 is a vertical end view of the embodiment shown in FIGS. 1 and 2.
Figure 6:
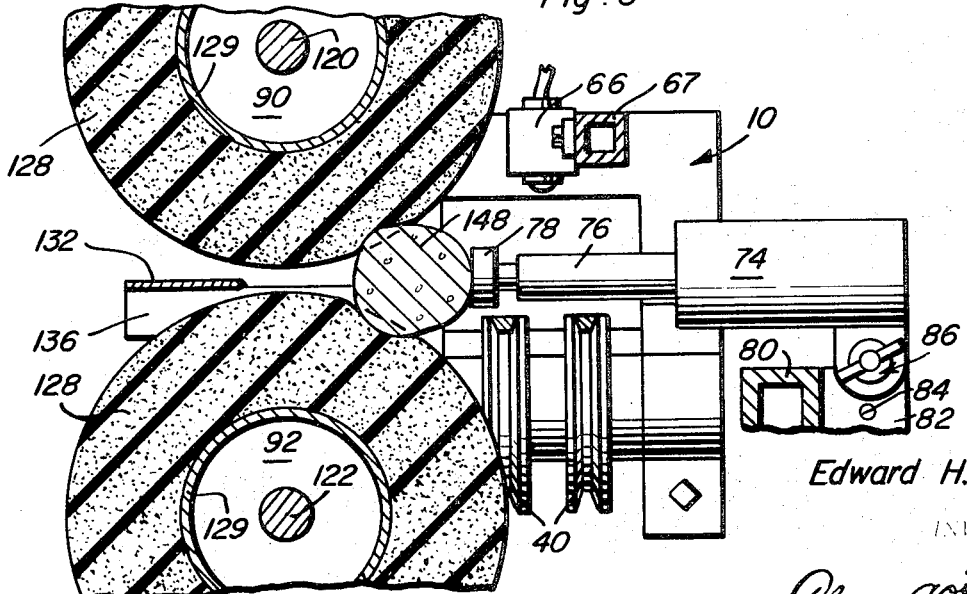
FIG. 6 is a sectional detail view on an enlarged scale taken generally along the line 6—6 of FIG. 2.

It is to be understood that some other device for orienting the articles fed to the sorting device may be used in place of disc 24 such as, for example, an automatic feeding system (not shown). A pair of spaced apart, endless conveyor belts 34 are tracked over a respective set of pairs of idler pulleys 36, 38, and 40, and drive pulleys 42 to form a conveyor 35 (FIG. 3). The pulleys 36, 38, 40 and 42 may be V-pulleys and belts 34 may be V-belts, as is shown in FIGS. 6 and 7. Pulleys 42 are connected to a drive sprocket 44 via a drive shaft 46. Sprocket 44 is connected to a suitable, known motor 48, which may be an electric motor, via a drive train 50. Drive train 50 and drive shaft 46 are mounted to frame 10 in a conventional manner. Motor 48 and shaft 52 of drive train 50 are mounted on a platform 54, which platform 54 is in turn mounted to frame 10 in a known manner. Sprocket chains 56 and 58, and sprockets 60, 61, and 62 are any suitable known types.

Figure 5:
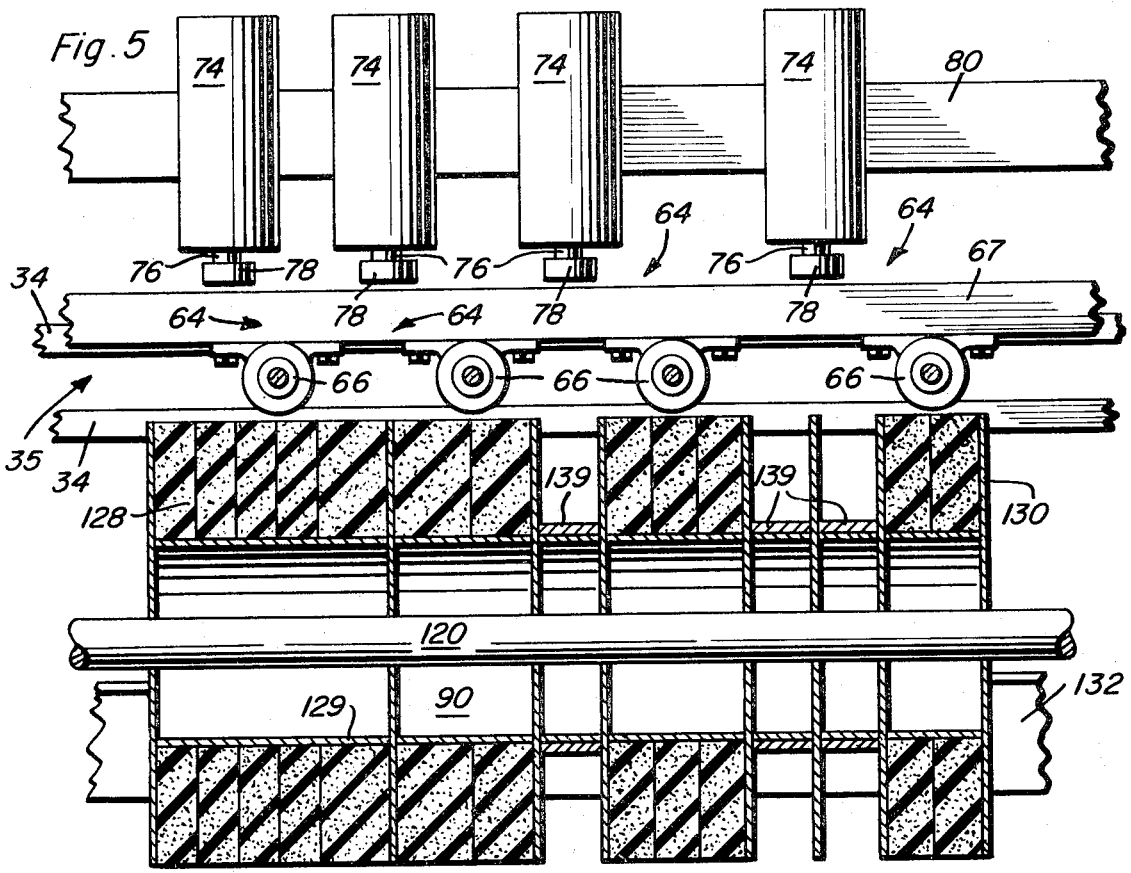
FIG. 5 is a sectional detail view taken generally along the line 5—5 of FIG. 4.

The sorting apparatus has a plurality of measuring stations 64 (FIG. 5) arranged along the path of conveyor 35. As can be seen in FIG. 3, each station 64 has a sensing device 66 mounted on a bar 67 fastened to frame 10. In the illustrated embodiment, sensing device 66 is a radiation receptor, such as a photoelectric cell which receives radiation from a radiation source 68. Source 68 may be, for example, a lamp. If the articles being sorted have high reflectivity, source 68 could be positioned adjacent sensing device 66 (not shown). A control unit 70 mounted on frame 10 is connected to each sensing device 66 via a plurality of couplings 72, which may be an electrical coupling. Unit 70 may be a plurality of adjustable timing devices of a known type — such as an electrical or mechanical timer. The timing device for a particular sensing device 66 is actuated by the lack of a signal from that sensing device 66. The timing devices of control unit 70 are operably connected in a known manner to an associated removing device 74. Removing device 74 has a plunger 76. A resilient contact pad 78 is attached to the outer end of plunger 76 to provide a padded contact surface. Pad 78 may be constructed from, for example, a suitable synthetic material, such as a foamed thermoplastic. Removing device 74 may be, for example, a suitable known electrical solenoid.

Removing devices 74 are mounted on a member 80 of frame 10 by an associated bracket 82 (FIGS. 6 and 7). Bracket 82 defines a plurality of holes 84 through which a suitable, known clamping device, such as a bolt and wing nut, is passed. Thus, each device 74 is tiltable about an axis parallel to the conveying path. Further, each device 74 may be adjusted perpendicular to the plane of conveyor 35 by using an appropriate hole 84.

Sensing devices 66 are positioned upstream from the associated removing device 74 with respect to the conveying direction. The conveying direction is shown by the arrows in FIGS. 1 and 5.

It is to be understood that sensing and removing devices other than those referred to above may be utilized within the scope of the present invention. For example, fluid driven piston and cylinder units may be substituted for the solenoid and plunger units 64. Further, other radiation than light may be used with sensing devices 66. Even known mechanical sensing units using feelers could be substituted.

A cutting device 88 has a pair of rolls 90, 92 driven by a motor 94 (FIG. 2), which again may be an electric motor, via a drive train 96 (FIG. 3). Drive train 96 has a belt 98 connecting a motor pulley 100 with a pulley 102 mounted on a shaft 104. A sprocket 106 is also mounted on shaft 104, and rotates a sprocket 108 via a sprocket chain 110. Sprocket 108 is mounted on a shaft 112 for rotation therewith along with another sprocket (not shown) which engages a sprocket chain 114. Chain 114 rotates rolls 90, 92 via sprockets 116 and 118 mounted on roll shafts 120 and 122, respectively, for rotation therewith, and an idle sprocket 124 mounted on a shaft 126 for rotation therewith.

Rolls 90, 92 are made up of a series of resilient discs 128 (FIG. 4). Disc 128 is varied in thickness in order to best grip the particular size of article being removed from the conveying path at the measuring station 64 related to that portion of the roll 90 or 92. Hollow discs 128 are mounted on a respective hollow drum 129 which is in turn mounted on its respective shaft 120 and 122. A plurality of cutting discs 130 are placed between selected disc 128, and a cutting bar 132 is arranged parallel to the conveying path and is directed toward the space 134 between rolls 90, 92. As can be seen in FIG. 3, bar 132 may be mounted on frame 10 by means of, for example, brackets 136, only one of which can be seen. A plurality of stripper fingers 138 are mounted on frame 10, and are arranged to press against drum 129 in those portions of rolls 90, 92 not provided with disc 128. Spacers 139 may be provided to maintain the proper distance between cutting discs 130.

In operation, disc 24 rotates in the counterclockwise, or arrow direction as seen in FIG. 2. Nonuniform articles defining longitudinal axes, such as potatoes, are placed on disc 24 at random in any known manner, such as by dumping from a container, and are subjected to a centrifugal force which causes the articles to abut against the curved surface of cylindrical wall 26. Because of the well known effects of centrifugal force on objects having a longitudinal dimension, the longitudinal axes of the articles will become tangent to wall 126. Rollers 27 prevent the articles from catching wall 126 and tumbling as a result. When the articles reach opening 28, they are transferred tangentially onto conveyor 35 with the aid of guide portions 30, 32. A single row of the nonuniform articles is thus formed. The articles will be cradled by belts 34, and oriented with their longitudinal axes parallel to the conveying path.

The single row of articles can now be fed by conveyor 35 past the plurality of measuring stations 64 whereat the longitudinal length for each article arriving at a measuring station 54 is measured. The passage of each article will block out the respective sensing device 66 from source 68. If sensing device 66 is blocked for a period of time greater than a predetermined time set in the associated control unit 70, the removing device 74 for the respective measuring station will be actuated, and the article will be removed from conveyor 35. In this manner, the articles are sorted by their longitudinal length. The control units 70 are set in the conveying direction to remove articles having progressively shorter longitudinal lengths, as is shown in FIG. 4 where the arrow at the right-hand side indicates the conveying direction.

Removing devices 74 are preferably adjusted perpendicular to the plane of conveyor 35 to be progressively closer to the level of the plane of conveyor 35 in the conveying direction, so that the articles may be contacted by the plungers 76 at substantially their center of gravity.

The sorted articles are now ready for cutting into uniform pieces. FIG. 4 shows four potatoes, 140, 142, 144 and 146 in position between rolls 90, 92. When removing device 74 is actuated, plunger 76 moves to the left in FIG. 6 and pushes an article, such as potato 148, between rolls 90, 92. Pad 78 actually comes into contact with the article, which results in the article retaining its orientation by keeping it in alignment. The resilient disc 128 catches the article and holds it in the proper orientation.

The article now proceeds through the cutting device 88 at a point associated with the respective measuring station at which the article is removed from conveyor 35 and is cut into substantially uniform pieces. FIG. 7 shows potato 148 passing through bar 132. Plunger 76 retracts in a known manner, as, for example, by a signal generated or discontinued by control unit 70. The signal could be the result of sensing device 66 receiving radiation again — that is, being unblocked — or unit 70 could have pulsed device 74 in such a manner that device 74 only is actuated for a predetermined time.

Referring to FIG. 4, it can be seen that the larger articles do not require as many disc 128 for retention as do the smaller articles such as 146. Further, the larger articles such as 140 are cut into more pieces than the smaller articles. This results in a substantially uniform size for all the cut pieces.

Figure 8:
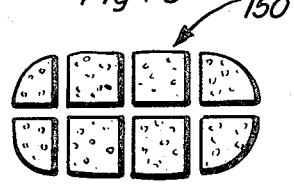
FIG. 8 is a schematic view of a potato cut into eight pieces.

FIG. 8 shows a potato 150, which could be potato 148, that has been cut into eight pieces.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. Apparatus for uniformly cutting nonuniform articles defining longitudinal axes, comprising, in combination:
    a. means for orienting each of a plurality of nonuniform articles along its longitudinal axis;
    b. conveyor means for receiving each oriented article, and defining a conveying path for forming a single row of articles oriented with their longitudinal axes parallel to the conveying path;
    c. means for measuring a longitudinal length for each article passing by any of a plurality of measuring stations included in said means for measuring and arranged along the conveying path;
    d. means associated with said means for measuring for removing from the conveying path each article having a longitudinal length greater than a length predetermined for the respective measuring station; and
    e. means arranged at each said measuring stations for receiving and cutting each removed article into pieces substantially uniform in size, the means for receiving and cutting including a pair of rolls, each roll provided with a hollow drum, a series of resilient discs of varied thickness arranged for gripping a particular size of article removed from the conveying path at the related measuring station, and a plurality of cutting discs placed between selected resilient discs, and together with the pair of rolls a cutting bar arranged parallel to the conveying path and directed toward a space between the rolls.

2. The apparatus as defined in claim 1, wherein the means for orienting includes means for subjecting each article to a centrifugal force, and the conveyor means receives articles transferred tangentially thereto from said means for subjecting.

3. The apparatus as defined in claim 2, wherein said means for subjecting has a cylindrical wall defining an opening for the transfer of the articles to said conveyor means, and a cone-shaped disc mounted for rotation and arranged within the cylindrical wall for supplying the centrifugal force.

4. The apparatus as defined in claim 3, wherein said means for subjecting further has means arranged in said cylindrical wall for preventing the articles from catching said cylindrical wall and tumbling as they approach said opening.

5. The apparatus as defined in claim 4, wherein the means for preventing is at least one roller.

6. The apparatus as defined in claim 1, wherein said conveyor means has a pair of parallel, spaced apart, endless conveyor belts.

7. The apparatus as defined in claim 1, wherein said measuring stations are arranged in the conveying direction to remove articles having progressively shorter longitudinal axis lengths.

8. The apparatus as defined in claim 1, wherein the means for removing has a plurality of plungers, and said means for measuring has a plurality of sensing devices arranged to be blocked by passing articles and operably connected to said plungers to actuate the same when said sensing devices are blocked for a predetermined time.

9. The apparatus as defined in claim 8, wherein said plungers have resilient contact pads providing padded contact surfaces, and are mounted to be vertically adjustable and tiltable.

10. The apparatus as defined in claim 1, wherein said means for cutting is a potato seed cutter, and the nonuniform articles are potatoes to be cut into uniform seed pieces.

11. The apparatus as defined in claim 5, wherein said conveyor means has a pair of parallel, spaced apart, endless conveyor belts, and said measuring stations are arranged in the conveying direction to remove articles having progressively shorter longitudinal axis lengths.

12. The apparatus as defined in claim 11, wherein the means for removing has a plurality of plungers, and said means for measuring has a plurality of sensing devices arranged to be blocked by passing articles and operably connected to said plungers to actuate the same when said sensing devices are blocked for a predetermined time, and said plungers have resilient contact pads providing padded contact surfaces, and are mounted to be vertically adjustable and tiltable.

13. The apparatus as defined in claim 12, wherein said means for cutting is a potato seed cutter, and the nonuniform articles are potatoes to be cut into uniform seed pieces.

* * * * *